United States Patent [19]
Malone et al.

[11] Patent Number: 5,605,318
[45] Date of Patent: Feb. 25, 1997

[54] ELECTRIC EXPANSION VALVE

[75] Inventors: Peter J. Malone, Mount Prospect, Ill.; Charles J. Tennies, Waukesha, Wis.; Mark A. Juds, New Berlin, Wis.; Todd L. King, Cedarburg, Wis.

[73] Assignee: Eaton Corporation, Cleveland, Ohio

[21] Appl. No.: 227,425

[22] Filed: Apr. 14, 1994

[51] Int. Cl.⁶ .................................................. F16K 31/06
[52] U.S. Cl. ................................................... 251/129.15
[58] Field of Search .................... 251/129.15, 129.08, 251/84, 129.01; 335/262

[56] References Cited

U.S. PATENT DOCUMENTS

| | | | |
|---|---|---|---|
| 3,707,992 | 1/1973 | Ellison et al. | 251/129.15 X |
| 4,074,700 | 2/1978 | Engle | 251/129.15 X |
| 4,546,955 | 10/1985 | Beyer et al. | 251/129.15 |
| 4,683,454 | 7/1987 | Vollmer et al. | 251/129.15 X |
| 4,725,040 | 2/1988 | Fornuto et al. | 251/129.15 |
| 5,127,624 | 7/1992 | Domke | 251/129.15 |

*Primary Examiner*—Kevin Lee
*Attorney, Agent, or Firm*—Roger A. Johnston

[57] ABSTRACT

A solenoid operated proportional control expansion valve having a tubular armature guide of non-magnetic material disposed externally of the valve blocks with a magnetic pole piece welded on the end of the tubular guide. A plastic encapsulated coil is received over the guide. The armature guide has a flange therein which in one embodiment is welded to a second flanged tube threaded into the valve blocks. In other embodiments the guide flange is directly mechanically fastened to the valve block. A cup-shaped pole frame is received over the coil for completing the magnetic flux loop about the coil.

18 Claims, 2 Drawing Sheets

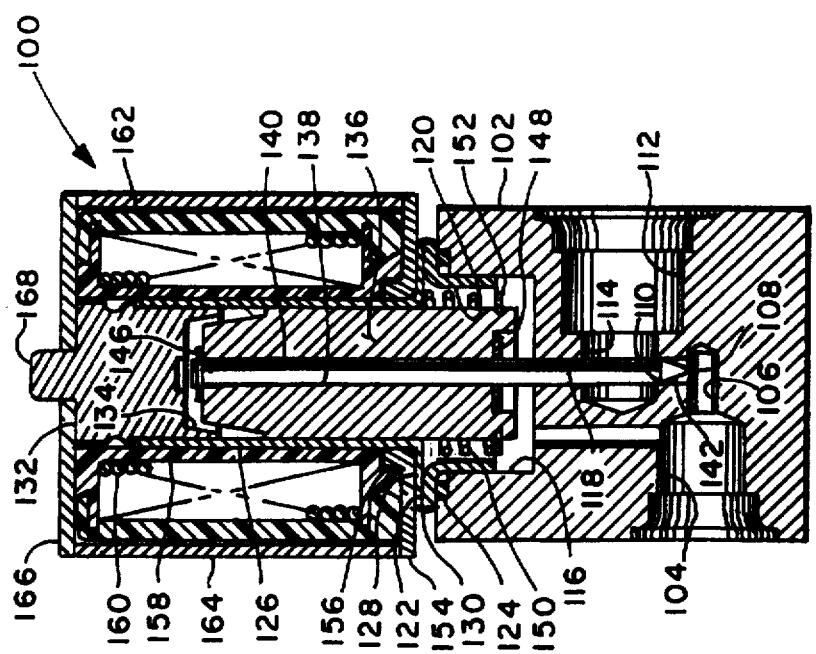
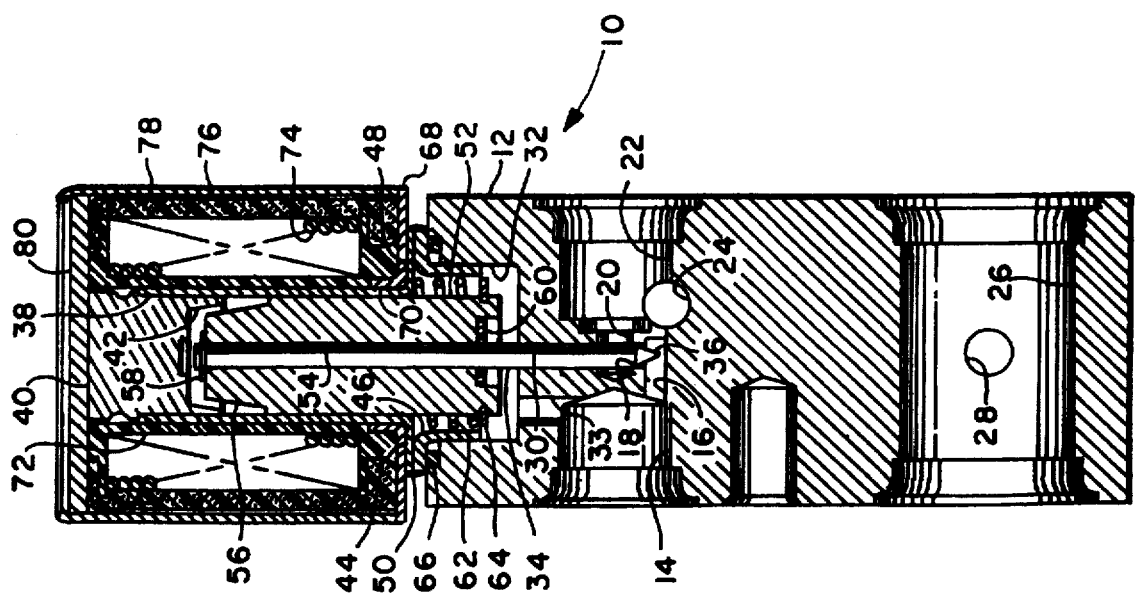

ELECTRIC EXPANSION VALVE

BACKGROUND OF THE INVENTION

The present invention relates to electrically operated valves and particularly to valves of the type operated by electromagnetic actuators such as solenoids. Solenoid operated electric valves are employed for a variety of applications and particularly in those fluid flow control applications where it is desired to maintain a proportional control of fluid flow in response to an electrical control signal. Typically, in such fluid flow control applications, a control circuit which may employ a microcomputer provides a control signal which has characteristics which vary dependant upon the desired changes in the flow of fluid through the valves.

In refrigeration systems it is commonplace to employ a thermal expansion valve for controlling flow of the compressed and liquified refrigerant from the condenser to provide refrigerant at a substantially reduced pressure to the evaporator inlet. Typically, thermal expansion valves have employed a liquid filled capsule sensing the temperature of the refrigerant discharging from the evaporator to control expansion of the fluid in the chamber to operate a pressure responsive moveable valve member for controlling the liquid refrigerant flow through the valve. Such diaphragm actuated thermal expansion valves are often used in automotive air conditioning systems for controlling refrigerant flow where rapid changes in operating conditions require a high degree of responsiveness by the valve. However, in automotive air conditioning systems, it has been desired to provide a valve which can do more than just react to changes in refrigerant temperature and to provide a valve which may be controlled in accordance with an electrical control algorithm or in response to electrical inputs via a microcomputer from sensors located in the compartment to be air conditioned. In particular it has been desired to provide an electric valve for an automotive air conditioning system which has the capability for proportional control responsive to a variable electrical control signal. It has been further been desired to provide such a valve which is low in manufacturing cost, easy to assemble and which is reliable in service over an extended period of time and capable of maintaining the seal integrity of the refrigerant system in service life.

SUMMARY OF THE INVENTION

The present invention provides a low cost, reliable and easy to manufacture solenoid operated expansion valve capable of proportional flow control. The valve has an armature guide formed of a tubular member closed at one end by a ferromagnetic pole piece welded thereon with the opposite end of the tubular member flanged outwardly and welded to a corresponding outwardly extending flange of an annular threaded member which is threaded onto the valve block. The ferromagnetic armature received in the guide tube has a pintle rod loosely received in a central bore therethrough and secured so that the rod moves with the armature. The rod extends from the armature into the valve block for positioning with respect to a valve seat for controlling fluid flow between an inlet and outlet port in the valve block. The end of the armature remote from the valve seat is tapered a controlled amount; and, a corresponding tapered recess is provided in the stationary pole piece in the end of the armature guide so that longitudinal overlap is provided to maintain adequate magnetic flux. A plastic encapsulated coil and magnetic pole frame are received over the armature guide; and, the pole frame preferably comprises a cylinder received over the plastic encapsulated coil and a ferromagnetic plate retained over the end of the cylinder.

The arrangement of the valve pintle rod through the center of the armature permits a limited amount of lateral movement of the pintle to permit proper seating on the valve seat and eliminates side forces on the armature to prevent any binding or impairment of the armature movement upon coil energization. The construction of the armature guide permits the guide, coil and pole frame to be pre-assembled and the armature assembled therein with the completed subassembly attached to the valve block by threaded engagement.

In another embodiment, the armature guide tube is formed of a single piece flared at one end with the pole piece welded for closing the opposite end; and, the flared end is secured to the valve block by deformation of metal with the flange sealing over a resilient seal ring provided in the block. In another embodiment, the flared end of the one-piece guide tube is secured to the valve block by a snap ring.

BRIEF DESCRIPTION OF THE DRAWINGS

FIG. 1 is a cross-section of a valve assembly incorporating the present invention with an unvalved refrigerant return passage formed in the valve body;

FIG. 2 is a cross-sectional view of an alternate embodiment of the invention without the unvalved return passage;

DETAILED DESCRIPTION

Figure 3:
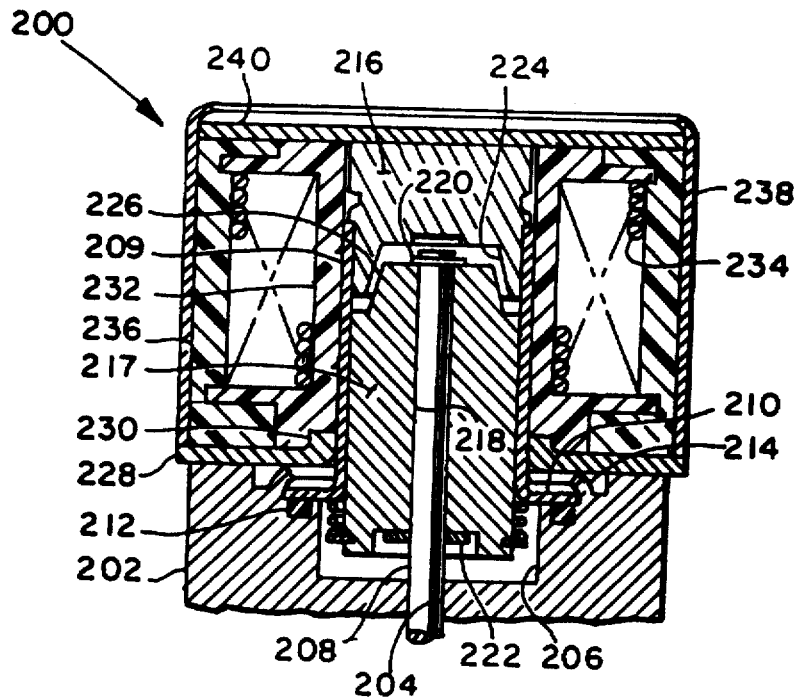
FIG. 3 is a portion of a section view of an alternate embodiment of the invention; and, FIG. 4 is a view similar to FIG. 3 of another embodiment of the invention.

Referring to FIG. 1, a valve assembly is indicated generally 10 and has a body 12 with an inlet fitting port 14 formed therein which communicates with a reduced diameter passage 16 having a valve seat 18 formed therein which communicates with a passage 20 which is in communication with a valve outlet port 22. If desired, an auxiliary sensing port 24 may be provided in the valve body for communicating with outlet port 22 for permitting an optional sensor (not shown) to be installed therein. If desired, an optional separate return flow passage 26 may be provided through the body 12 with a sensing port 28 communicating therewith for convenience of providing a mounting for a sensor (not shown) for connection to receive therethrough evaporator discharge flow returning to the compressor inlet. An interconnecting passage 33 is provided between inlet port 14 and the bottom of counter bore 32.

A valve seat access opening in the form of bore 30 is provided and communicates with a counter-bore 32 formed in the end of the block 12. Bore 30 is sized to provide guidance for movement of a valve member or rod 34 slidably received therein. Valve rod 34 has a conically tapered end 36 which is configured to close on valve seat 18 as will hereinafter be described in greater detail.

A tubular guide member 38 formed of non-magnetizable material has one end thereof closed by a stationery pole piece 40 formed of magnetizable material and which is secured and sealed about the end of tubular guide 38 by any suitable expedient as, for example, by weldment therearound. Pole piece 40 has the side thereof interior to the tubular member 38 provided with a conically tapered recess 42. The end of the tubular guide member 38 opposite pole piece 40 is flared outwardly to form a flange 44. A second tubular member 46 has a corresponding outwardly extending annular flange 48 which is attached and sealed to flange 44 by any suitable expedient as, for example, peripheral weldment indicated by reference numeral 50 flanges 44 and 48 together forming a convolution. The end of tubular member 46 opposite flange 48 is threaded externally for engagement in corresponding threads provided in counter bore 32 in the valve body. Alternatively, flange 44 may be formed as a convolution in guide member 38.

An armature 52 formed of magnetizable material is received in the tubular guide member 38 which is sized to provide a closely fitting sliding engagement with the armature; and, the armature 52 has a central bore 54 formed longitudinally therethrough. The upper end of the armature 52 has a conically tapered region 56 which is longitudinally nested within and in spaced relationship within the recess 42 of the pole piece 40. The nested arrangement of the conically tapered portion 56 and tapered recess 42 provides for an air gap with longitudinal overlap for magnetic flux concentration. In the presently preferred practice the end of the armature has an included apex angle of about 10° as does the tapered wall 42 of the pole piece recess.

The upper end of the valve rod 34 is received in bore 54 in the armature; and, the bore 54 is sized to permit a loose fit therein and some limited lateral movement of the rod 34 with respect to bore 54. The valve rod 34 is secured longitudinally with respect to the armature 52 by a snap ring 58 provided about the upper end of valve rod 34 and registering against the upper end of the armature and a frictionally engaging ring 60 pressed over the rod and registered against adjacent the opposite or lower end of the armature 52. Rod 34 is thus captured for movement with armature 52.

The armature is biased in a downward direction by a spring 62 which has its upper end registered against the flange 44 with its lower end registering against a snap ring 64 provided in a groove in the lower end of the armature 52.

The flange 48 of tubular member 46 is sealed at the upper end of counter bore 32 by a suitable seal ring 66 received in a groove formed in the upper end of the body 12.

An annular washer member comprises a portion of a pole frame and is denoted by reference numeral 68 and has the inner periphery thereof flanged axially at right angles thereto as denoted by reference numeral 70 The flange 70 is received over the tubular armature guide 38 in closely fitting engagement, A bobbin 72 of thermoplastic material is received over the remaining portions of the tubular guide member 38; and, a coil of electrically conductive material 74 is wound about the bobbin 72 and encapsulated with thermoplastic material indicated by reference numeral 76 in FIG. 1.

An outer portion of a magnetic pole frame preferably comprises a cylindrical member 78 which is received over the coil encapsulation 76 and which extends upwardly beyond the end of the coil encapsulation. Another portion of the pole frame comprises a plate or disc like member 80 received over the end of cylinder 78 and retained therein by any suitable expedient as for example crimping the upper edge of the cylindrical member 78 as shown in FIG. 1. The magnetizable disc member 80 is in contact with the upper end or face of the pole piece 40 attached to the tubular guide 38 for completing the flux loop about the coil 74. It will be understood that the lower end of the cylindrical member 78 is in contact with the upper surface of the washer 68 and is secured thereto by any suitable expedient as for example weldment. Disc member 80 and cylindrical member 78 thus form a cup-shaped pole frame about the coil which is closed by washer 68.

In the embodiment of FIG. 1, the coil 74, bobbin 72, encapsulation 76, washer 68, cylindrical member 78, and disc 80 may be preassembled as a subassembly and received over the guide member 38 and pole piece 40 as a unit and retained thereon by any satisfactory means as for example press fitting of the bobbin over the tube 38 or mechanical strapping (not shown).

In the present practice of the invention, the movement of the armature in response to a control signal positions the tapered end 36 of the valve with respect to valve seat 18, for controlling flow to outlet port 22. It will be understood that the spring-rate of spring 62 is chosen, such that the electrical control signal can produce sufficient force on the armature, based on the available number of ampere-turns of the coil, to overcome the bias of the spring 62 and position the valve rod for the desired flow.

In the present practice the valve is operated as a proportional valve, i.e., where movement of the armature is proportional to the energization of the coil. However, it will be understood that the coil may alternatively be energized sufficiently to effect rapid full stroke of the armature to the fully open position for single "on"-"off" operation.

Referring to FIG. 2, another embodiment of the invention is illustrated in the form of a valve assembly indicated generally at 100 having a valve body or block 102 with an inlet port 104 which communicates with a reduced diameter passage 106 which in turn communicates with a valving passage 108. An outlet port 112 communicates with a reduced diameter passage 114 which communicates with valving passage 108 and has valve seat 110 formed therein. The upper side of the block is open to a recess or counter bore 116 which has a central bore 118 formed therein which communicates with passage 114 and is aligned with the valve seat 110.

A tubular member 120 has threads provided on the exterior of one end thereof and is threadedly engaged in the bore 116. The opposite end of the member 120 has an outwardly extending flange 122 formed thereon which has the undersurface thereof sealing against a seal ring 124 provided in a groove formed in the block 102.

A tubular armature guide member 126 formed of non-magnetizable material has one end thereof flanged outwardly as denoted by reference numeral 128 in FIG. 2; and, the flange is attached to flange 122 of the threaded tubular member by any suitable expedient such as peripheral weldment denoted by reference numeral 130.

The upper end of tubular guide member 126 has a stationary magnetizable pole piece 132 received therein for closing and sealing the upper end of the tube 126. In the presently preferred practice the pole piece 132 is secured to the upper end of tube 126 by weldment. The pole piece 132 has a recess formed in the interior or lower side thereof with the sidewall thereof conically tapered as denoted by reference numeral 134.

An armature 136 formed of magnetizable material is slidably received in the guide tube 126; and, the armature has a central bore 138 formed therethrough. The upper end of the armature 136 is conically tapered and is nested in the conically tapered wall 134 of recess in pole piece 132.

A valve member in the form of a rod 140 is received through the central bore 138 in the armature; and, the rod extends downwardly through passage 118 in the body 102. Rod 140 has a tapered end 142 which is positioned with respect to valve seat 110 and seats against valve seat 110 in the fully closed position. The rod 140 is retained in longitudinal direction or direction or motion of the armature by a snap ring 146 provided in the upper end thereof which snap ring registers against the upper surface of the armature 136. A friction ring 148 is pressed over the lower end of the rod 140 and against the lower end of armature 136 to prevent relative movement of the rod with respect to armature 136 in the direction or motion of the armature. The rod 140 is thus captured and moves with the armature 136.

The bore 138 in the armature 136 is sized so as to provide clearance around the rod 140 and permit a limited amount of lateral movement of the rod 140 in the armature 136 to enable the tapered end 142 to be self-aligning insofar as seating on valve seat 110 is concerned without causing any side forces on the armature.

The armature and rod 140 are biased in a downward direction by a spring 150 having the upper end thereof registered against the undersurface of flange 128 of the armature guide, with the opposite end of spring 150 registered against a snap ring 152 secured in a groove in the lower end of armature 136.

A pole frame washer denoted 154 has a flange 156 formed about the inner periphery thereof generally at right angles thereto and which is received over guide tube 126 in closely fitting engagement. A coil bobbin 158 about which is wound coil 160 of electrically conductive material and which is encapsulated with thermoplastic material denoted by reference numeral 162 is received over guide tube 126 in closely fitting arrangement.

An annular pole frame member formed of magnetizable material in the form of a cylinder 164 is received over the coil encapsulation 162 and is attached to the washer 154 at its lower end by any suitable expedient such as weldment. A second pole washer 166 formed of magnetizable material is received over the end of the coil and registers over a central lug 168 formed on pole piece 132. Washer 166 has its undersurface registered against the upper surface of pole piece 132 and is attached at its outer periphery to the cylinder 164 preferably by weldment. It will be understood that the operation of the valve assembly 100 is similar to that of the valve assembly 10 of FIG. 1.

Referring to FIG. 3, another embodiment of the invention is illustrated and denoted generally at 200 as having a valve body 202 a portion of which is shown in FIG. 3. Body 202 has a valve seat access bore 204 communicating with a counter bore 206 provided in the upper surface of the valve body with a valve member comprising a rod 208 slidably guided in the bore 204.

An armature guide tube 209 has an outwardly extending flange 210 formed at one end thereof which flange is disposed over a seal ring 212 provided in a groove about the bore 206. Flange 210 is retained in its position and in sealing engagement with seal ring 212 by a deformation of metal of the body about the periphery of the flange as denoted by reference numeral 214. The opposite or upper end of the armature guide tube 209 has received therein a pole piece member 216 formed of magnetizable material and which is retained and sealed in the tube 209 by suitable expedient such as weldment.

An armature 217 of magnetizable material is slidably received in guide tube 209 and has a central bore 218 provided therethrough in which is received the valve rod 208 in loosely fitting arrangement. The valve rod 208 is restrained longitudinally by snap ring 220 provided in a groove adjacent the upper end of the rod 208 and registered against the upper end of armature 217. A friction ring 222 is received over the rod 208 in frictional engagement therewith and registered against the lower end of armature 217, thus capturing rod 208 for movement with armature 217.

Pole piece 216 has a recess formed in the lower surface thereof which has a conically tapered sidewall 224 into which is nested a conically tapered surface 226 provided on the upper end of armature 217 for flux concentration. Surfaces 224 and 226 preferably have a taper of 10° included angle. The conical taper serves to distribute the magnetic flux such that the magnetic force on the armature 217 varies linearly with respect to changes in the armature position and the control signal. These characteristics thus attribute a proportional performance to the magnetic actuator and effect an overall proportional type operation of the valve.

A pole frame washer 228 of magnetizable material has a flange formed about the inner periphery thereof and extending at right angles to the washer 228 as denoted by reference numeral 230. The flange 230 of the washer 228 is closely fitted over the armature guide tube 209 and registered against the upper surface of the block 202.

A coil bobbin 232 formed of thermoplastic material is similarly received in closely fitting engagement over the armature guide tube 209 with the end thereof engaging flange 230. A coil 234 of electrically conductive material is wound on bobbin 232 and is suitably encapsulated with thermoplastic material as denoted by reference numeral 236.

Pole frame washer 228 is contacted at its outer periphery by a second pole frame member comprising a cylindrical cover of magnetizable material denoted by reference numeral 238 which is secured to washer 228 about the periphery thereof preferably by weldment. The flux loop about the coil is completed by a pole frame member 240 comprising a magnetizable disc extending transversely across and registered against the upper surface of the pole piece 216. Disc member 240 is retained at its outer periphery on the cylindrical member 238 by deformation of the material thereof over the periphery of the disc 240. It will be understood that the operation of the valve assembly 200 is similar to that of the valve 10.

Figure 4:
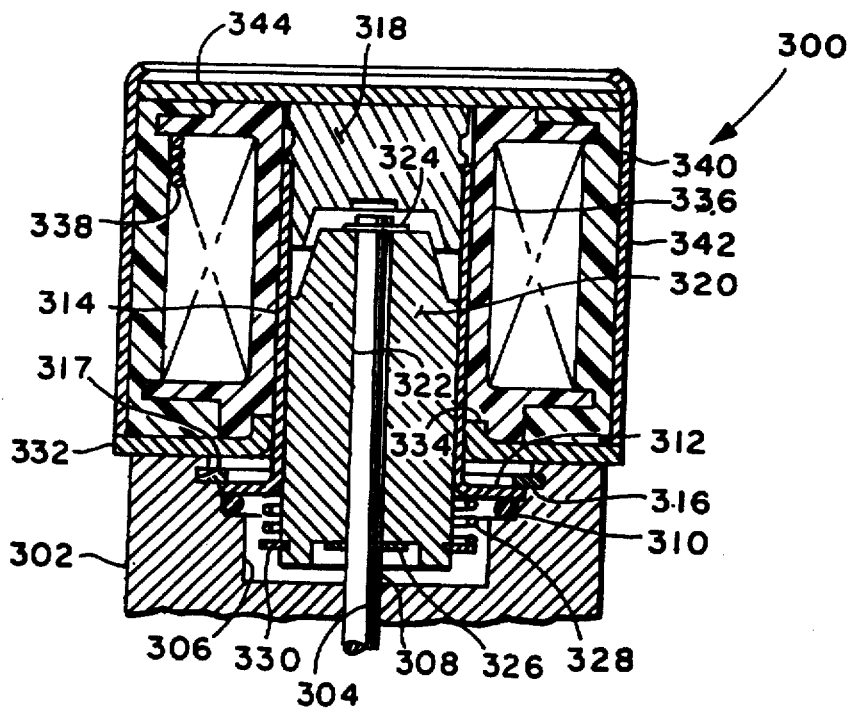

Referring to FIG. 4, another embodiment of the invention is indicated generally at 300 and has a valve body 302 shown partially as having a valve seat access bore 304 with a valve member comprising a rod 308 slidably received therein for providing a valving action against an unshown valve seat. The bore 304 communicates with a counter bore 306 which is open to the upper surface of the block 302. A seal ring 310 is provided in a groove about the periphery of counter bore 306 which is covered by an armature guide tube 314 having an annular outwardly extending flange 312 formed at one end. The end face of the guide tube flange 312 is registered against seal ring 310 and retained thereon in sealing contact by a retaining ring 316 which is engaged in a groove provided in the body 302.

A guide tube member 314 which is formed of non-magnetizable material is closed and sealed at one end by a magnetizable pole piece 318 which is retained in the end of the tube 314 preferably by weldment.

An armature 320 is slidably received in the guide tube 314 and has a central bore 322 formed therein. A valve rod 308 is received in bore 322 in loosely fitting arrangement in a manner similar to the valve rode in the embodiment of FIG. 3. Valve rod 308 is retained longitudinally in the armature 320 by a snap ring 324 engaging a groove in the upper end of the rod and which is registered against the upper end of the armature the rod 308 and by a friction ring 326 frictionally received over the opposite rod and registered against the opposite end of the armature 320.

The armature is biased downwardly by a spring 328 having its upper end registered against the lower surface of flange 312 and the lower end retained by a retaining ring 330 received in a groove adjacent the lower end of the armature.

A pole frame washer 332 formed of magnetizable material has a right angle flange 324 formed about the inner periphery thereof. Flange 334 is received over the guide tube 314 in closely fitting engagement. A plastic coil bobbin 336 is received over guide tube 314. A coil 338 of electrically conductive material is wound on bobbin 336 and is encapsulated by plastic material 340 molded thereover.

The pole frame is completed by annular cylindrical member 342 which has its lower end welded about the periphery thereof to washer 332 and a pole frame disc 344, both of which are formed of magnetizable material. The disc 344 has its undersurface in direct contact with the upper surface of pole piece 318 and the edge of cylinder 342 deformed over the periphery of disc 344 to retain the disc. The operation of the valve assembly 300 is similar to that of the embodiment of FIG. 1.

The present invention thus provides a novel low-cost technique for manufacturing a solenoid operated valve of the type particularly suitable for controlling expansion of refrigerant in a circulating system and which provides for electrical operation of the valve and proportional control of the flow thereby. Although the invention as hereinabove been described with respect to the illustrated embodiments, it will be understood that the invention is capable of modification and variation and is limited only by the following claims:

We claim:

1. An electrically operated expansion valve assembly comprising:

(a) body means defining an inlet port and an outlet port and a valving passage connecting said inlet and outlet ports with a valve seat formed in said passage;

(b) ferromagnetic armature means having an annular configuration and movably disposed with respect to said body means and including an elongated non-magnetic valve member operable for movement with respect to said valve seat for controlling flow from said inlet to said outlet port, said valve member extending through said annular armature means and including fastening means received over and frictionally engaging said valve member for retaining said valve member on said armature means;

(c) an armature guide attached to said body means exteriorly thereof and operative to guide movement of said armature means, said armature guide formed of non-magnetic material and encasing said armature means in fluid pressure sealing arrangement, said guide including a ferromagnetic pole piece therein; and, (d) electromagnetic operator means received over said armature guide and including a coil and a generally cup-shaped ferromagnetic pole frame disposed about said coil, said pole frame co-operating with said guide pole piece to form a ferromagnetic flux loop about said coil.

2. The valve assembly defined in claim 1, wherein said armature guide includes a tubular member formed of non-magnetic material closed at one end by said ferromagnetic pole piece.

3. The valve assembly defined in claim 1, wherein said armature guide includes a tubular member of non-magnetic material flanged at one end; and, an annular member flanged at one end and threaded on the other end with said flanges joined in fluid pressure sealing arrangement.

4. The valve assembly defined in claim 1, wherein said valve member comprises an elongated member received centrally through said armature means and extending therefrom with a valving surface on one end thereof, said valving surface configured to conform to said valve seat.

5. The valve assembly defined in claim 1, wherein said valve assembly includes means biasing said armature means in a direction tending to close said valve member on said valve seat.

6. The valve assembly defined in claim 1, wherein said armature means includes an annular ferromagnetic member with said valve member comprising a rod received centrally through said annular member and extending outwardly from the end thereof, said rod retained on said annular member for movement therewith.

7. The valve assembly defined in claim 1, wherein said pole piece as a tapered recess and said armature means has a tapered end received in said recess.

8. The valve assembly defined in claim 1, wherein said pole piece and said armature means have portions thereof in mutually overlapping arrangement in the direction of motion of said armature means.

9. The valve assembly defined in claim 1, wherein said pole piece has an external portion thereof engaging said pole frame.

10. The valve assembly defined in claim 1, wherein said armature guide is releasably attached to said body means.

11. The valve assembly defined in claim 1, wherein said the valve means comprises an elongated rod received through said armature means in a loosely fitting arrangement and secured for preventing relative movement in the direction of said movement of said armature means of said valve member with respect to said armature means, wherein said valve member is permitted limited movement relative to said armature means in a direction transverse to the direction of movement of said armature means.

12. A method of making a solenoid operated valve comprising:

(a) providing a tubular member of non-magnetizable material and forming an outwardly extending flange on one end thereof;

(b) closing the end of said tubular member opposite said flange with a ferromagnetic pole piece and sealing the closure thereof in a fluid pressure tight attachment;

(c) providing an annular member of non-magnetizable material and forming an outwardly extending flange thereon;

(d) securing said annular member flange by weldment to said tubular member flange;

(e) disposing a magnetizable armature and valve member within said tubular member and sealingly attaching said annular member onto a valve block; and, (f) disposing a coil of electrically conductive material and a ferromagnetic pole frame over said armature guide.

13. The method defined in claim 12, wherein said step of sealing said closure includes welding said tubular member to said pole piece.

14. The method defined in claim 12, wherein said step of sealing by attaching said annular member includes the steps of threading said annular member onto the valve block.

15. The method defined in claim 12, wherein said step of disposing said pole frame includes providing a cylindrical member and deforming portions of one end thereof over a disc-shaped member.

16. A method of making an electromagnetically operated valve assembly comprising:

(a) providing a tubular guide member of non-magnetizable material and forming a flange thereon and forming another flanged tubular member and welding said flanges to form a convolution;

(b) closing one end of said tubular member with a ferromagnetic pole piece and sealing the closure thereof in a fluid pressure tight attachment;

(c) disposing a magnetizable armature and valve member within said tubular member;

(d) providing a valving block with an opening for accessing a valve seat and providing a seal ring about said opening;

(e) attaching the end of said tubular member opposite said pole piece to said block opening and sealing said convolution on said seal-ring; and, (f) disposing a coil of electrically conductive material and a ferromagnetic pole frame over said tubular guide member.

17. A method of making an electromagnetically operated valve assembly comprising:

(a) forming a tubular guide member of non-magnetizable material with one end thereof closed with a magnetizable pole piece and forming an outwardly extending flange on an open end;

(b) disposing a magnetizable armature for movement within said tubular guide member;

(c) forming a bore in said armature and disposing a non-magnetizable valve member in said bore and permitting limited movement of said valve member in said bore in a direction transverse to the direction of armature movement and frictionally engaging said valve member on one end of said bore;

(d) forming a opening in a valve block and accessing a valve seat therein through the opening;

(e) securing and sealing said armature guide member outwardly extending flange over said opening; and, (f) disposing a coil of electrically conductive material and over said guide member and disposing a pole frame about said coil.

18. The method defined in claim 17, wherein said step of disposing an armature and pole piece includes the steps of forming on a recess having conically tapered wall in said pole piece and forming a corresponding conically tapered peripheral surface on said armature and nesting said conically tapered surfaces.

* * * * *